(12) United States Patent
Angelopoulos

(10) Patent No.: US 8,540,575 B2
(45) Date of Patent: Sep. 24, 2013

(54) METHOD AND SYSTEM FOR INCREASED REALISM IN VIDEO GAMES

(75) Inventor: Athanasios Angelopoulos, San Diego, CA (US)

(73) Assignee: White Knuckle Gaming, LLC, Bountiful, UT (US)

( * ) Notice: Subject to any disclaimer, the term of this patent is extended or adjusted under 35 U.S.C. 154(b) by 2275 days.

(21) Appl. No.: 10/266,795

(22) Filed: Oct. 8, 2002

(65) Prior Publication Data

US 2004/0067788 A1 Apr. 8, 2004
US 2010/0137045 A2 Jun. 3, 2010

(51) Int. Cl.
*A63F 13/12* (2006.01)

(52) U.S. Cl.
USPC .............................................. 463/42; 463/30

(58) Field of Classification Search
USPC ...... 463/1–4, 6–8, 40–43, 30–33; 700/90–93
See application file for complete search history.

(56) References Cited

U.S. PATENT DOCUMENTS

| | | | | |
|---|---|---|---|---|
| 5,411,259 | A | * | 5/1995 | Pearson et al. .................. 463/36 |
| 5,526,035 | A | | 6/1996 | Lappington et al. |
| 5,694,546 | A | * | 12/1997 | Reisman ......................... 705/26 |
| 5,810,680 | A | | 9/1998 | Lobb et al. |
| 5,860,862 | A | | 1/1999 | Junkin |
| 5,971,855 | A | * | 10/1999 | Ng ................................. 463/42 |
| 6,080,063 | A | | 6/2000 | Khosla |
| 6,135,881 | A | | 10/2000 | Abbott et al. |
| 6,200,216 | B1 | * | 3/2001 | Peppel ............................. 463/1 |
| 6,261,179 | B1 | | 7/2001 | Miyamoto et al. |
| 6,292,706 | B1 | * | 9/2001 | Birch et al. ....................... 700/91 |
| 6,306,033 | B1 | | 10/2001 | Niwa et al. |
| 6,347,993 | B1 | | 2/2002 | Kondo et al. |
| 6,368,210 | B1 | | 4/2002 | Toyohara et al. |
| 6,412,780 | B1 | * | 7/2002 | Busch ............................. 273/292 |
| 6,783,460 | B2 | * | 8/2004 | Galyean et al. ................. 463/40 |
| 2002/0010026 | A1 | | 1/2002 | York | |

OTHER PUBLICATIONS http://www.answers.com/topic/microsoft-baseball-2001.*
Newton's Telecom Dictionary by Harry Newton. Printed Mar. 1998 by Flatiron Publishing. ISBN 1-57820-023-7. p. 460.*
NFL 2K1 GameFAQs—Dreamcast—http://www.gamefaqs.com/console/dreamcast/file/914206/10283—Feb. 8, 2001.*
Madden NFL 2003—Playstation2 Manual—http://www.replacementdocs.com—release date: Aug. 12, 2002.*
NBA 2K1 Manual, Sega Dreamcast video game system, Nov. 1, 2000.*
NFL 2K1 Review, http://www.gamespot.com/dreamcast/sports/nfl2k1/review.html, 9/08/200.*
Nintendo Entertainment System—Tecmo Super Bowl—1991.*

(Continued)

*Primary Examiner* — Damon Pierce
(74) *Attorney, Agent, or Firm* — Workman Nydegger

(57) ABSTRACT

A system and method for updating parameters of a video game is provided. As events occur in the real world that may influence a game attribute, a parameter is recorded on a server. A video game player may connect to the server and download the parameter. The parameter is stored by the video game and changes an attribute of the video game. Thus, for example, the new performance characteristics of the rising star may be recorded on the server as improved performance parameters. When these parameters are downloaded by the video game player, the video game incorporates the star-like qualities of the rising star.

35 Claims, 14 Drawing Sheets

(56) References Cited

OTHER PUBLICATIONS

Weters, *NFL 2K1: FAQ by Weters*, Hosted by GameFAQs, Version 3.1, http://www.gamefaqs.com/console/dreamcast/file/914206/8841, last accessed Jul. 2, 2009.
Sycho Bubba Crusty, *NFL 2K1: FAQ by Tazzmission*, Hosted by GameFAQs, Version 2.0, http://www.gamefaqs.com/console/dreamcast/file/914206/8814, last accessed Jul. 2, 2009.
*Madden 2002 Manual*, EA Sports, 209 Redwood shores Parkway, Redwood City, CA 94065, available at http://www.replacementdocs.com, © 2001 Electronic Arts, Inc., last accessed Oct. 7, 2009.
*NBA Showtime*, NBA on NBC, Operation Manual for 4-Player, 25" Dedicated Video Game, Gold Edition, Mar. 2000, © 2000 Midway Amusement Games, LLC, 3401 North California Avenue, Chicago, Illinois 60618-5899, available at http://www.midway.com, last accessed Oct. 7, 2009.
*NFL Fever 2002 Manual*, Xbox, Microsoft Corporation, One Microsoft Way, Redmond, WA 98052-9953, available at http://www.xbox.com, © 1997-2001 by RAD Game Tools, Inc., last accessed Oct. 7, 2009.
*NFL Fever 2003 Manual*, Xbox, Microsoft Corporation, One Microsoft Way, Redmond, WA 98052-9953, available at http://www.xbox.com, © 1997-2002 by RAD Games Tools, Inc., last accessed Oct. 7, 2009.
*NHL 97 Instruction Booklet*, Black Pearl Software, c/o T-HQ, Inc, 5016 No. Parkway, Calabasas, CA 91302, available at http://www.replacementdocs.com, © 1996 Electronic Arts, last accessed Oct. 7, 2009.
Todd, Brett, *The History of Football Games*, available at http://www.gamespot.com, © 2009 CBS Interactive, Inc., last accessed Oct. 7, 2009.
*4th & Inches Manual*, © 1988 Accolade, available at www.lemonamiga.com, last accessed Oct. 7, 2009.
*TSR Manuals*, Tecmo Bowl®, © 1998, tsrken@voicenet.com, available at http://www.atarihq.com/tsr/manuals/tecmobwl.txt, last accessed Oct. 7, 2009.
Smith, James dated Aug. 30, 2000, *NFL Gameday 2001 (PSX) Review*, Sports Gaming Network, available at http://www.sports-gaming.com/football/nfl_gameday_2001/review_psx.shtml, last accessed Oct. 7, 2009.
Riot, Sydney, GameVortex Communications, *NFL GameDay 2002*, video game release date: Aug. 7, 2001, available at http://www.psillustrated.com/psillustrated/soft_rev.php/17/nfl-gameday-2002-ps2.html, last accessed Oct. 7, 2009.
*Legends Football '98 Review*, available at http://www.uk.videogames.games.yahoo.com/pc/reviews/legends-football--98-be22be.html, © 2009 Yahoo!, last accessed Oct. 7, 2009.
*Catch The Fever*, Your Football Gaming Complex, ©2000 Catch The NFL Fever, available at http://www.sportplanet.com/catchthefever/dhfever.shtml, last accessed Sep. 29, 2009.
*RIP 2001 Rosters*, Apr. 14, 2001, available at http://www.sportplanet.com/catchthefever/index.shtml, last accessed Oct. 9, 2009.
*RIP 2002 Rosters*, Sep. 6, 2001, availble at http://www.sportplanet.com/catchthefever/index.shtml, last accessed Oct. 7, 2009.
*Welcome to the VPNFL: The Vaguely Plausible National Football League*, available by early Dec. 1998 on the FBPro Dark Side at http:///www.geocities.com/colosseum/stadium/8273, last accessed Oct. 9, 2009.

\* cited by examiner

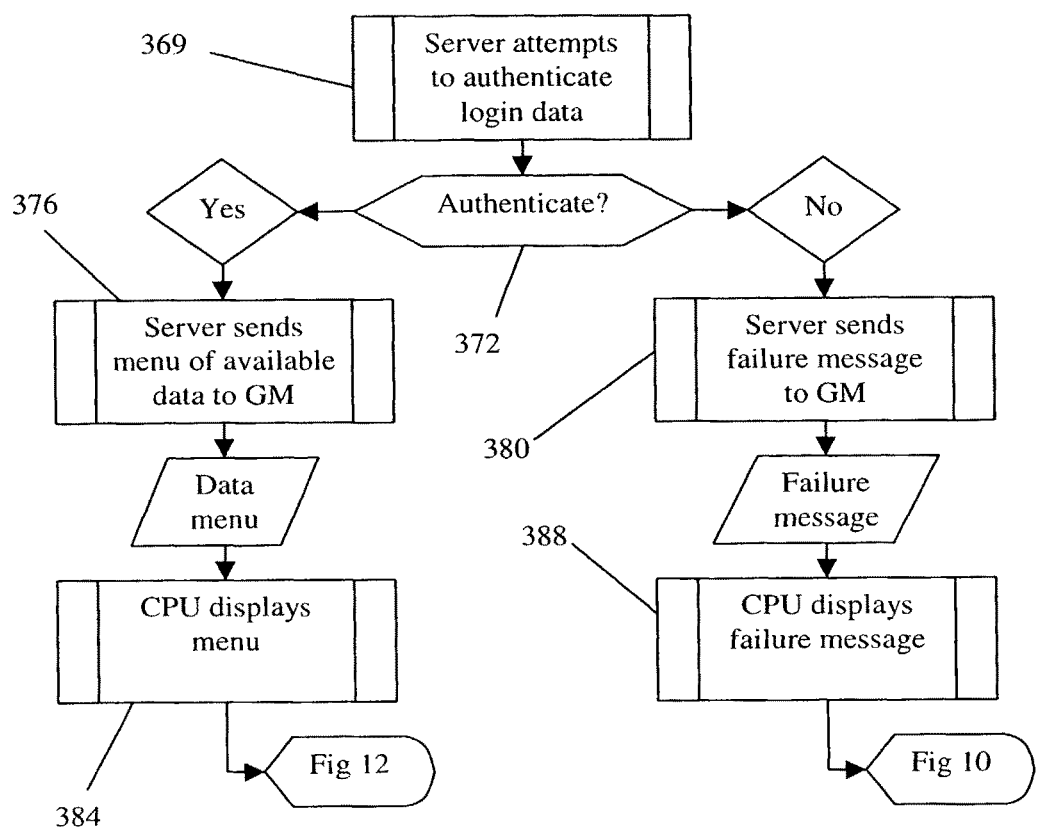

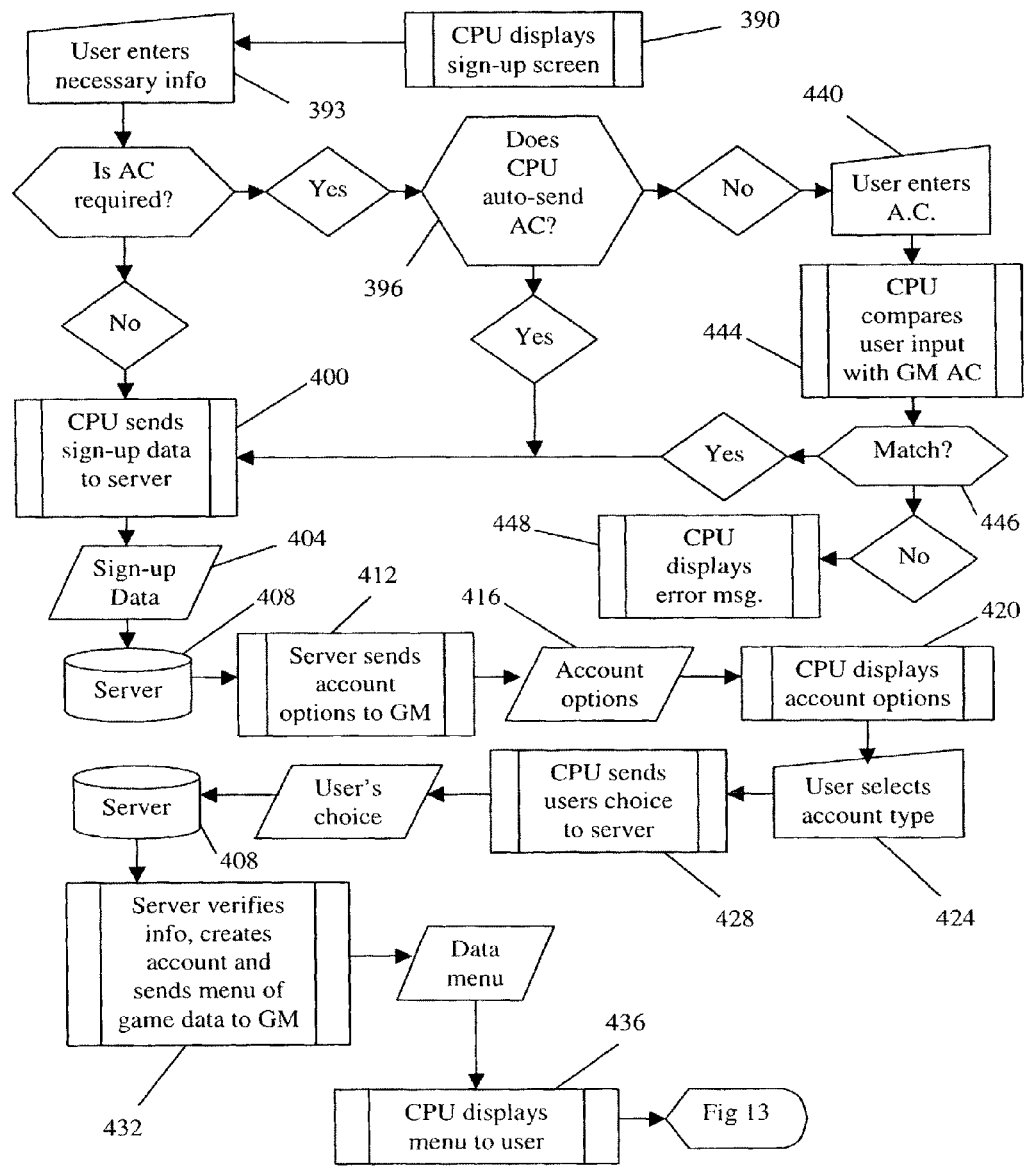

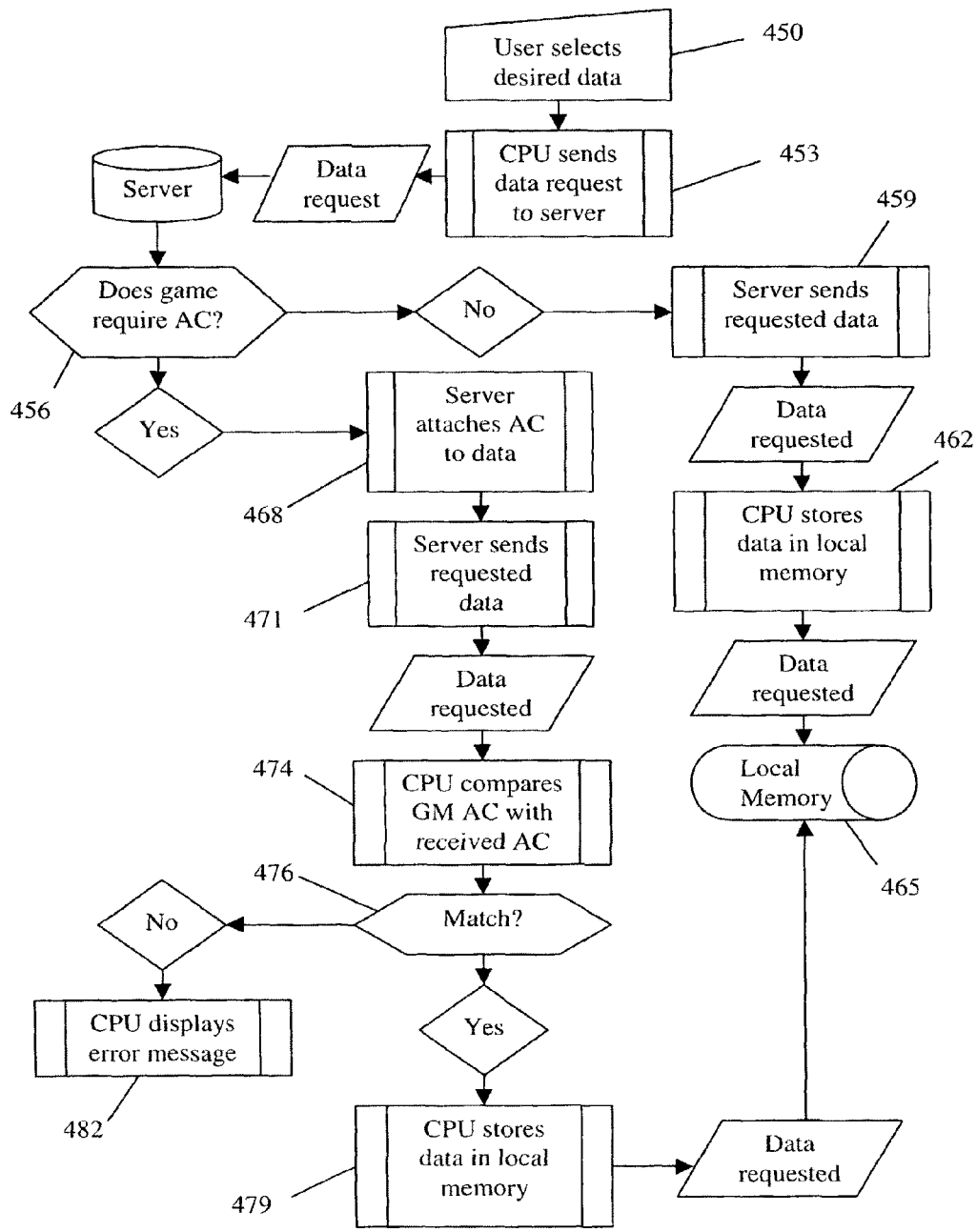

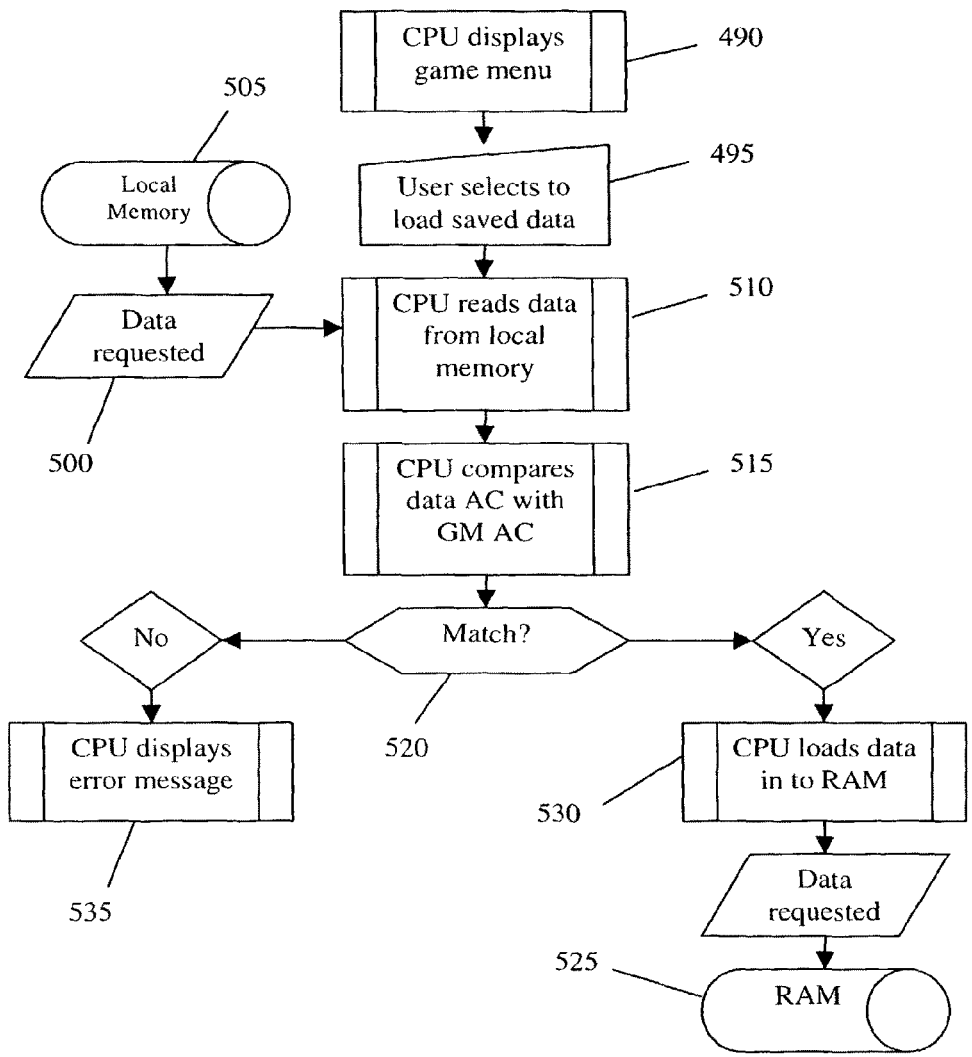

METHOD AND SYSTEM FOR INCREASED REALISM IN VIDEO GAMES

BACKGROUND

Many video games attempt to recreate realistic situations. For example, video games simulating sports games and matches are popular. They commonly even show actual leagues with correct teams. hometowns may be shown, with realistic stadiums. Athletes' uniforms represent professional athletes' actual uniforms. Specific athletes are represented. For example, an image of Shaquile O'Neil may be used as one of the players on the Los Angeles Lakers basketball team. Kobe Bryant and all of Shaquile's actual teammates may be on the team with him.

But the realism goes far beyond just images. The video game characters have characteristics approximating their real life counterparts. For example, the video game Shaquile may be very good at dunking the basketball, but horrible at shooting freethrows. Parameters are stored on the video game medium that cause the different characters to replicate their real life counterparts' performance.

Video game producers typically produce professional sports video games once per year. The performance parameters and visual aspects are typically specified based on the most recent year. For example, Barry Bonds of the San Francisco Giants baseball team had a homerun average of (73 homeruns)/(476 at bats)=15.3 percent during the 2001 season. This average can be used to set a video game parameter so that the video game character Barry Bonds has a similar tendency to hit homeruns. A problem with this system is that the performance parameters and visual aspects of a video game are fixed at the time the video game is produced.

The players of this type of game continually demand increased realism in such games. For example, more and more parameters are added to distinguish one character from another and to more accurately simulate the performance of real life athletes. Also, the realism of the visual aspects of players, teams and stadiums is continually increased. For example, the ivy on the outfield wall of Wrigley Field in Chicago may be shown in a baseball video game.

The problem remains that visual aspects and performance characteristics of real life sports players, teams and environments change throughout the year.

SUMMARY

Sports video games attempt to achieve realism. Particularly, sports video games frequently attempt to emulate professional sport details. Actual professional athletes are shown, frequently including such details as jersey numbers, physical stature and even facial features. Performance characteristics are emulated. For example, in a baseball video game, an individual professional athlete's batting average may be used to influence a video game character's batting performance. Frequently, actual professional teams are provided for video game play. For example, in a basketball video game, players can play the Los Angeles Lakers versus the Chicago Bulls, complete with rosters, players and even a stadium. Video game players are demanding more and more realism like this.

A major problem with this system is that professional sports change in many ways. Athletes' performances change over the course of a season, or even a day. Additionally, athletes may be traded from team to team, or become injured. Stadia may change. Sports announcers may change. This leaves a video game behind, in an unrealistic state. For example, if a new star rises on the professional sports scene, during the middle of a season, that new star's incredible performance will not be duplicated by the video game. Video game players are stuck playing the game with the star having his pre-star characteristics. They must wait for the video game producers to produce a new video game incorporating the new star-like performance of the rising star. This is unsatisfying for video game players. They want to play a video game that matches the professional sport performance characteristics, look and feel.

Accordingly, a system and method for updating parameters of a video game is provided. As events occur in the real world that may influence a game attribute, a parameter is recorded on a server. A video game player may connect to the server and download the parameter. The parameter is stored by the video game and changes an attribute of the video game. Thus, for example, the new performance characteristics of the rising star may be recorded on the server as improved performance parameters. When these parameters are downloaded by the video game player, the video game incorporates the star-like qualities of the rising star.

This quantifiably increases realism. Video game players can download up-to-the-minute statistics and visual aspects for incorporation into their video games. Instead of playing with last season's teams, video garners get a simulation of the fresh new events of the week, day, or hour.

BRIEF DESCRIPTION OF THE DRAWINGS

FIG. 11 shows a portion of a process for authenticating a video game user, continued from FIG. 10.

FIG. 12 is a flow diagram showing a process for signing up a new user of a video game with downloadable statistics.

FIG. 13 is a flow diagram showing a download process of a new game parameter.

FIG. 14 is a flow diagram showing game play in a case in which an AC is required.

DETAILED DESCRIPTION OF SEVERAL EMBODIMENTS

Figure 1:
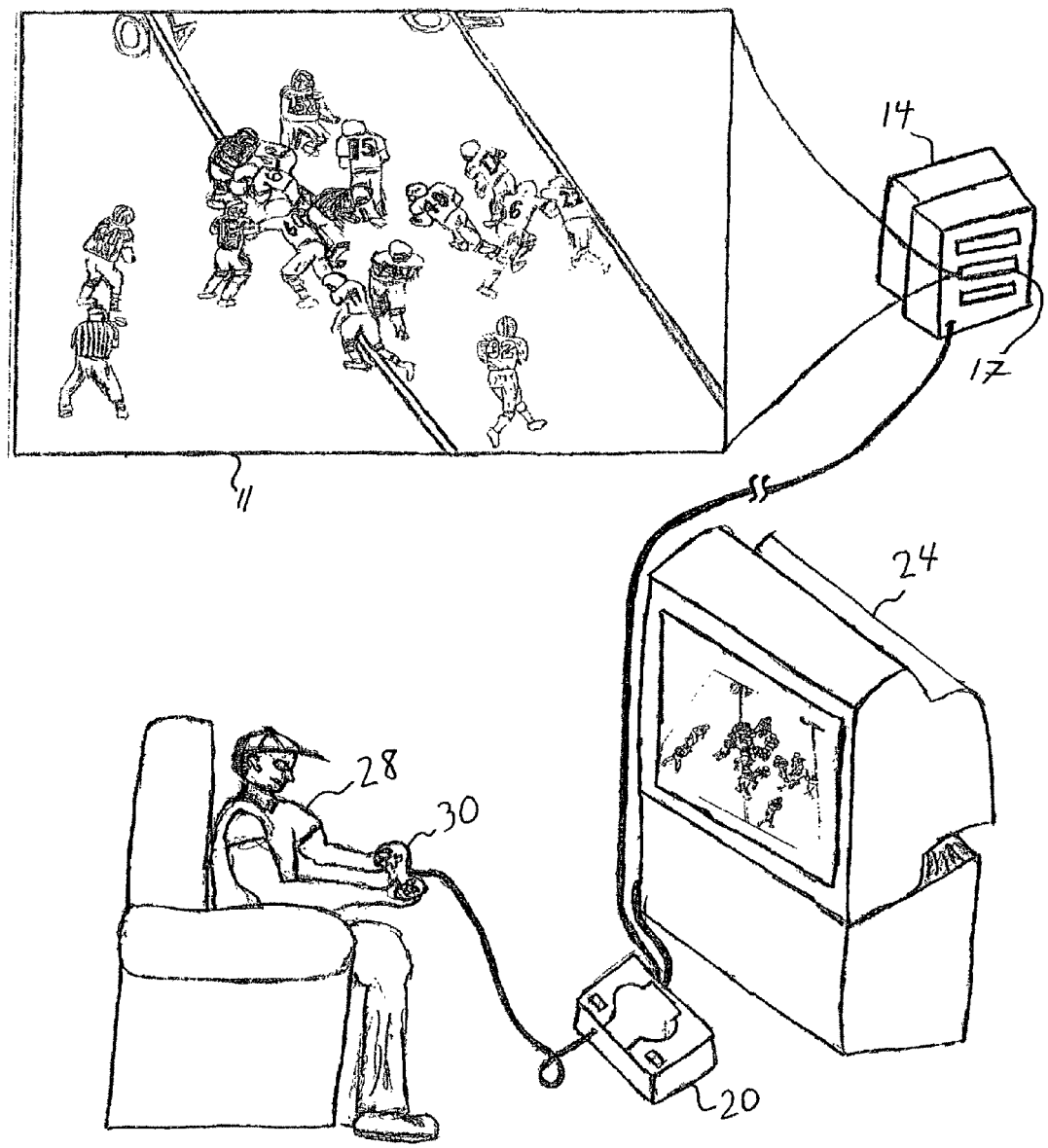
FIG. 1 is an external view showing a structure of a video game system and a historical event.

FIG. 1 is an is an external view of a video game system and a historical event. An historical event 11 takes place. For example, the event may be a World Cup soccer game, or an American football game. In a more specific example, the event may be the occurrence of a new yearly completion percentage, or other performance statistic, of a specific quarterback in a specific professional American football game.

A datum 17 relating to the historical event 11 is recorded on a computer readable medium known as a network server 14. A game machine 20 is coupled to the network server 14. The game machine 20 downloads the datum 17, which may, for example, represent a quarterback's completion percentage, a basketball player's freethrow percentage, or any other outcome of a realistic event. The datum 17 is then used to play a video game, which is displayed on a monitor 24. A user 28 plays the video game using controller 30. In this way, the user gets to play a video game the more accurately simulates a the real world.

For example, a datum representing a quarterback's new completion percentage is loaded into memory (not shown) in the game machine 20. Then, the user 28 can play an American football video game with current statistics. This makes the video game more enjoyable to the user, adding increased realism. As real life professional players' performances change, users can still play with statistically accurate players.

Figure 2:
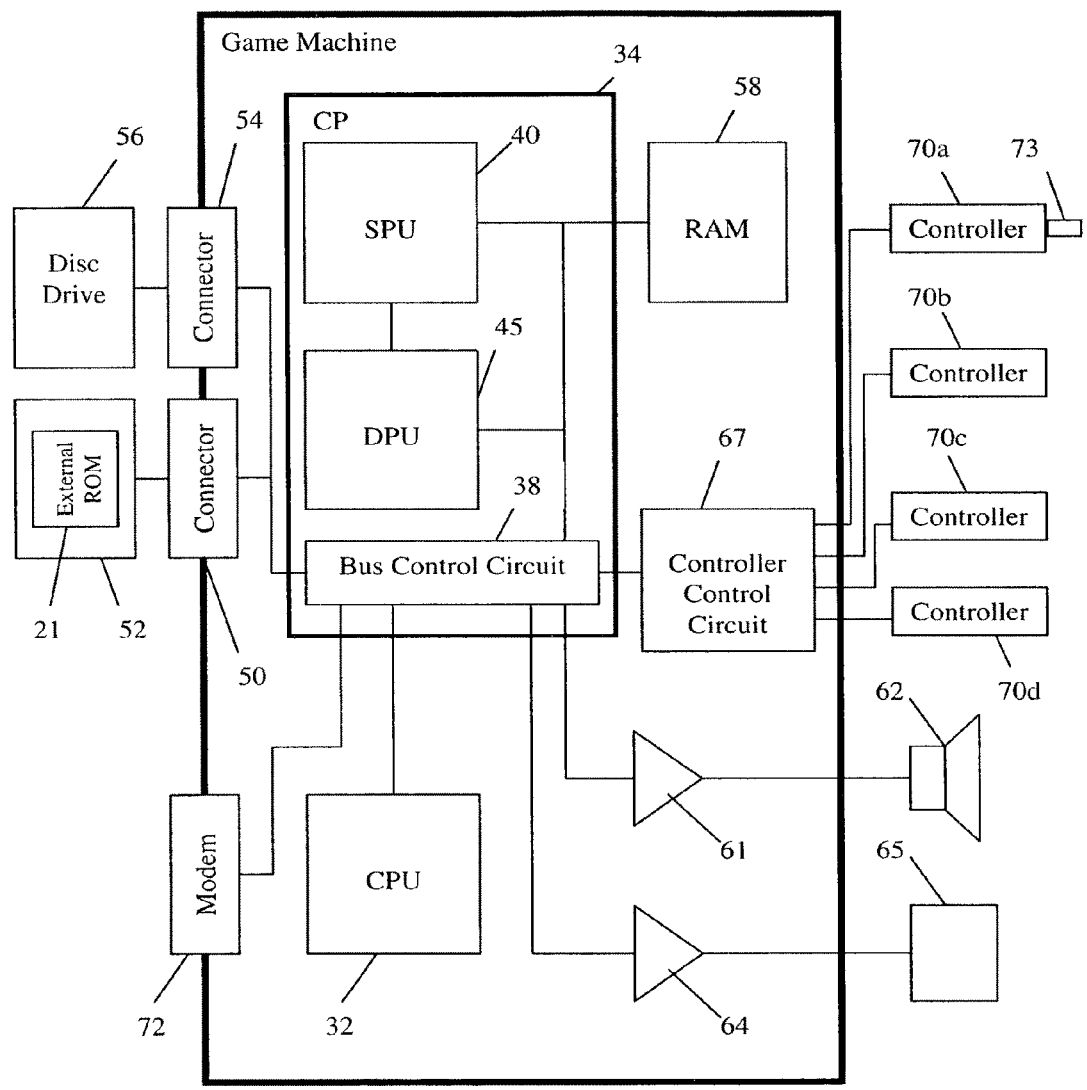
FIG. 2 is a high level block diagram of a video game system.

FIG. 2 is a block diagram of a video game system. The video game machine 20 incorporates a central processing unit (CPU) 32 and coprocessor (CP) 34. The CP 34 includes a bus control circuit 38 for controlling buses, a signal processing unit (SPU) 40 for performing polygon coordinate transformation, shading treatment, etc., a display processing unit (DPU) 45 for rasterizing polygon data into an image to be displayed and converting the data into a data from (dot data) stored on a Frame memory. The CP 34 is coupled to a cartridge connector 50 for detachably mounting with a ROM cartridge 52, a disc drive connector 54 for detachably mounting with a disc drive 56, and a RAM 58. Also, the CP 34 is connected with an audio signal generating circuit 61 for outputting a sound signal to an audio output device 62, processed by the CPU 32, and an image signal generating circuit 64 for outputting an image signal to a display 65. Further, the CP 34 is coupled with a controller control circuit 67 for serially transferring operational data for one or a plurality of controllers 70A-70D and data for a RAM cartridge 73 for extension.

A modem 72 is coupled to the bus control circuit 38. The modem 72 is also preferably coupled to the internet (not shown). As discussed with reference to FIG. 1, a server coupled to the internet stores performance, visual image and audio parameters. The modem 72 couples to the server and downloads a parameter for play in the video game. The CPU 32 sends a signal through the bus control circuit to initialize the modem 72 and control the modem 72 to download the parameter. Preferably, the parameter is stored in RAM 58 for play of the video game, as discussed below. It will be understood by those of skill in the art that other configurations of video game machines are possible. For example, the CPU 32 and the CP 34, or portions of the CP 34, may be incorporated as one component. Also, for example, RAM 58, may be divided into more than one memory element, or other types of memory elements may be included.

Figure 3:
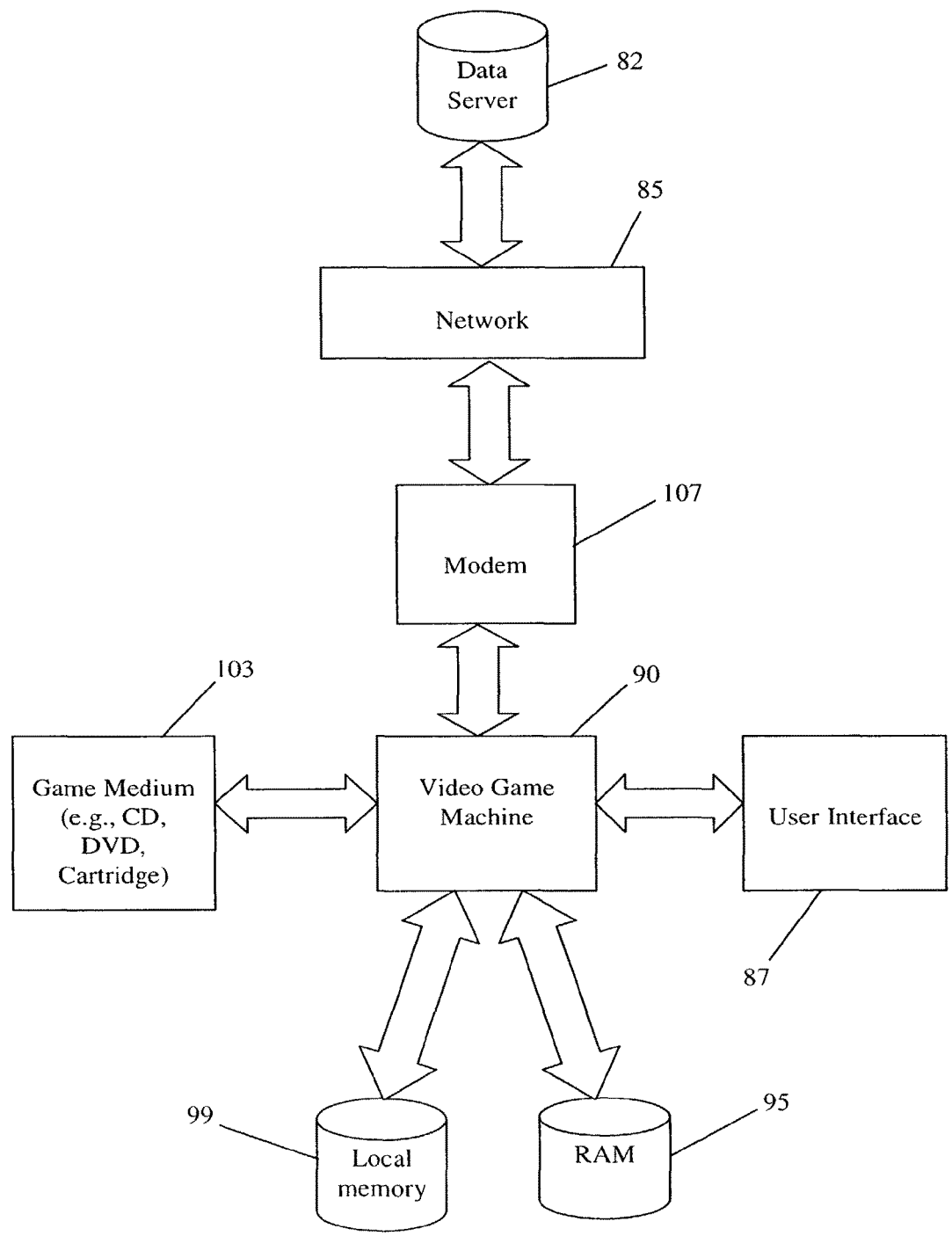
FIG. 3 is a block diagram of a video game system.

Referring now to FIG. 3, a block diagram of a video game system is shown. A data server 82 is coupled to a network 85. The network may be, for example, what is commonly referred to as the internet, or, alternatively, the network 85 may be another type of network, such as a local area network (LAN). The data server 82 stores information for use in video games. Advantageously, new statistical results or parameters can be stored on the data server 82. For example, when a real professional athlete changes a performance rating, the changed performance rating can be stored on the data server 82. For example, when a professional baseball player changes his batting average, the changed batting average can be stored on the data server 82. Or, as a second example, if a professional American football quarterback changes his completion percentage the changed completion percentage can be stored on the data server 82. This allows a video game player to play a video game with the new statistics. The changed statistic may be stored as the actual number that the statistic represents. For example, if a batting average goes from 0.275 to 0.278, then the number 0.278 may be stored on the data server. Or the new statistic may be stored on the data server as a parameter of a video game. The parameter can then be used to effect how the video game character interacts with the video game environment.

Referring again to FIG. 3, the user (not shown) plays the video game by entering inputs through a user interface 87. The user interface 87 may be, for example, a video game controller (not shown). The user interface 87 is coupled to a video game machine 90, which may be a video game machine 20, as shown with reference to FIG. 2. The video game machine 90, is coupled to a RAM 95 and a local memory 99, preferably a read only memory (ROM). The RAM 95 is used for storing data and rules (described later with reference to FIG. 4) from the game medium 103. Advantageously, the parameter is also stored on the RAM. Thus, the video game is played with the changed statistic. Advantageously, a video game character, such as, for example, an American football quarterback, will play more realistically based on the video game character's real life performance, such as, for example, a completion percentage.

The video game machine is coupled to a modem 107 for coupling to the network 85. The parameter is downloaded by the video game machine 90 from the data server 82 by means of the modem 107 and the network 85. As will be understood by those of skill in the art, the modem 107 may be incorporated as part of the video game machine 90, or a separate component.

Figure 4:
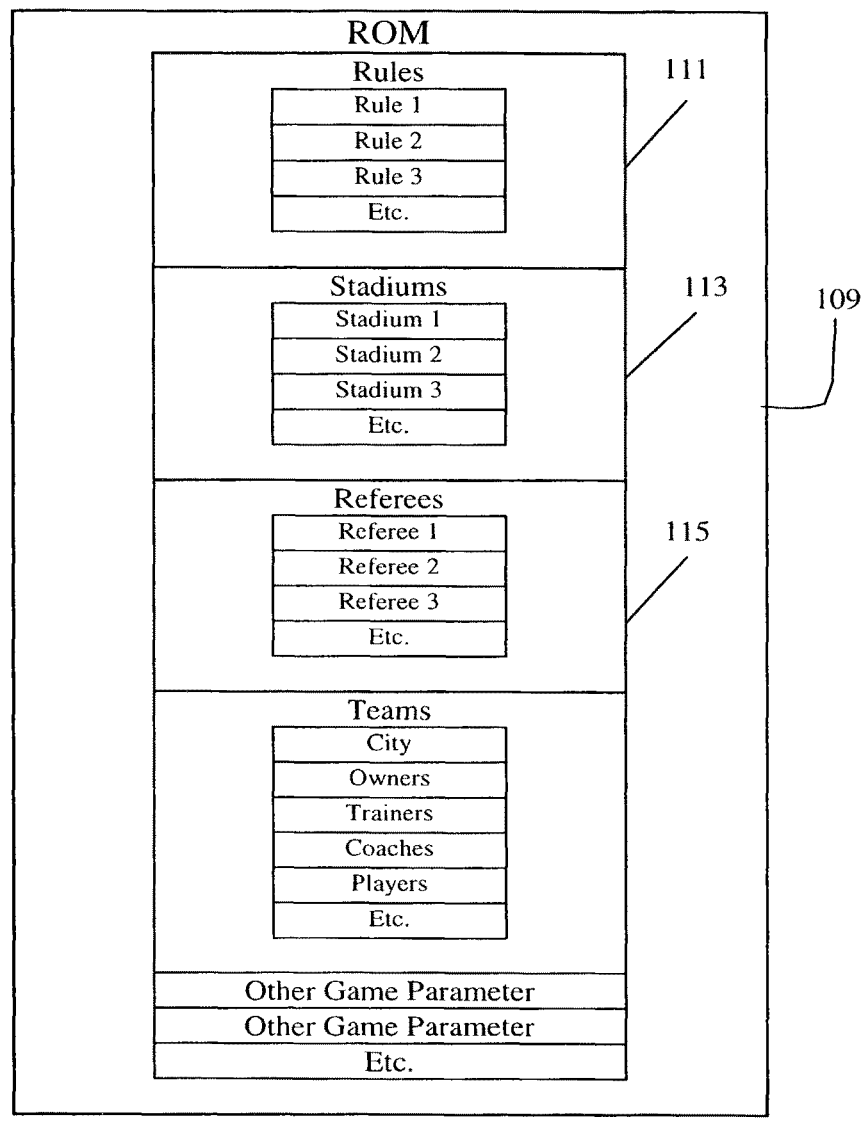
FIG. 4 is a block diagram of a game medium.

FIG. 4 is a block diagram of a game medium, preferably a ROM 109. The game medium may be, for example, a compact disc (CD), a digital video disc (DVD), or a cartridge. The ROM 109 includes many rules and parameters for the video game. Rules 111 are stored on the ROM 109. The rules 111 are shown as Rule 1, Rule 2, Rule 3, etc. The rules govern how the game is played and displayed on the user interface. Advantageously, the rules can be updated to match the rules of the real world.

There are also other parameters stored on the ROM 109. For example, stadium parameters 113 may be stored. For example, the game may display Wrigley Field for play by the Chicago Cubs and Fenway Park for play by the Boston Red Socks. For example, the ivy on the homerun wall of Wrigley Field is green and flourishing during certain parts of the year, such as from May to July. During April, August and September, the ivy is browner. The color of the ivy shown in a baseball video game showing Wrigley Field can change based on the time of the year that the video game is played.

As another example of how realism can be increased, new memorials to great players can be implemented in the video game stadiums. For example, in 2002, Ted Williams' number, "9", was displayed in the leftfield grass of Fenway Park after the start of the season. Baseball video games were already produced. So the video game fields did not have the number on the field, failing to duplicate real life. Now, the field can be changed to match real life after the game is produced, sold and played in the user's home.

Referring again to FIG. 4, referees 115 may be stored. Referees' appearances and performance may be stored. For example, some referees in basketball call technical fouls frequently. Some referees rarely call technical fouls. Parameters can be stored regarding the individual referees that simulate these real life differences.

Team statistics and other parameters can also be stored, such as, for example, the city, owners, trainers, coaches, players, etc. For example, Mike Bibby of the Sacramento Kings, during the 2001-2002 regular season averaged 13.7 points and 12.3 shots attempted per game. In the playoffs of the same season, he averaged 20.2 points and 16.1 shot attempted per game. These improved playoff statistics can now be downloaded. A video game player can play a basketball video game with a Mike Bibby character incorporating the better performing real world Mike Bibby.

As another example, the 2000-2001 Chicago Bears' opponents scored an average of 22.2 points per game with an average of 114.2 rushing yards per game. The 2001-2002 Chicago Bears' opponents scored an average of 12.7 points per game with an average of 82.1 rushing yards per game. This change was not reflected in video games played during the 2001-2002 season. At that time, the newest video games reflected the statistics from the 2000-2001 season. Thus, the Chicago Bears on the video games played poorly, whereas the Chicago Bears on the real football field played very well. This dichotomy between video game and real life is frustrating to many video game players.

Figure 5:
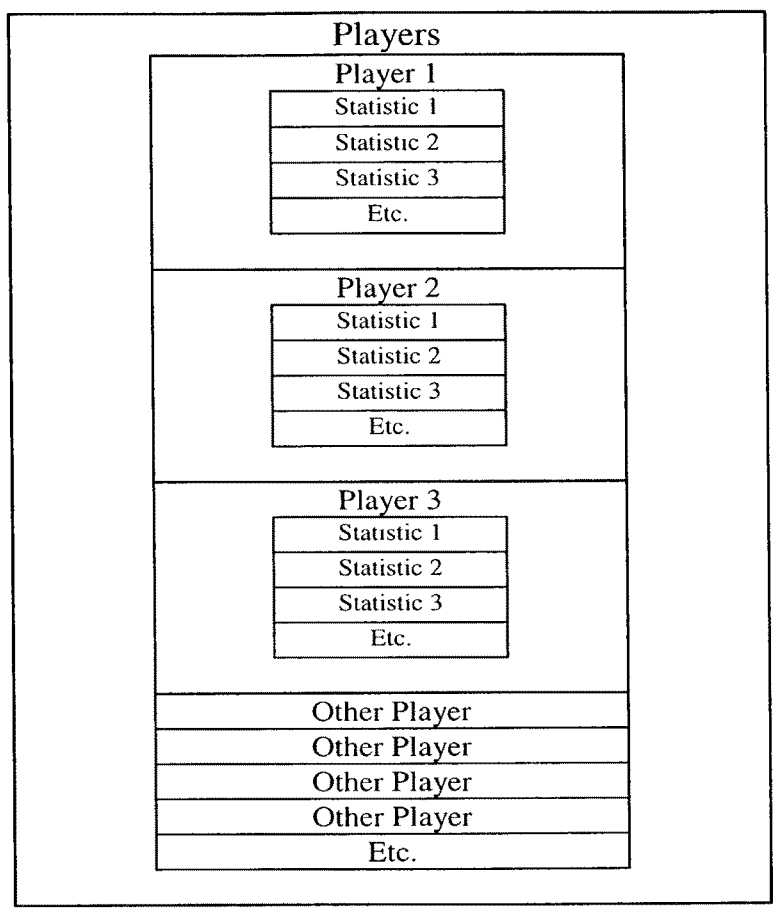
FIG. 5 is a block diagram of the players stored in ROM.

FIG. 5 is a block diagram of the players stored in ROM. Player 1, Player 2, Player 3 and several other players are shown. Under each player, several statistics are shown. For example, if the video game is basketball, Statistic 1 may be a player's field goal percentage. Statistic 2 may be a free throw percentage. Statistic 3 may be blocks per game. One skilled in the art will appreciate that the number and type of statistics stored will vary with the game and with the way the video game designer choses to design the game.

Figure 6:
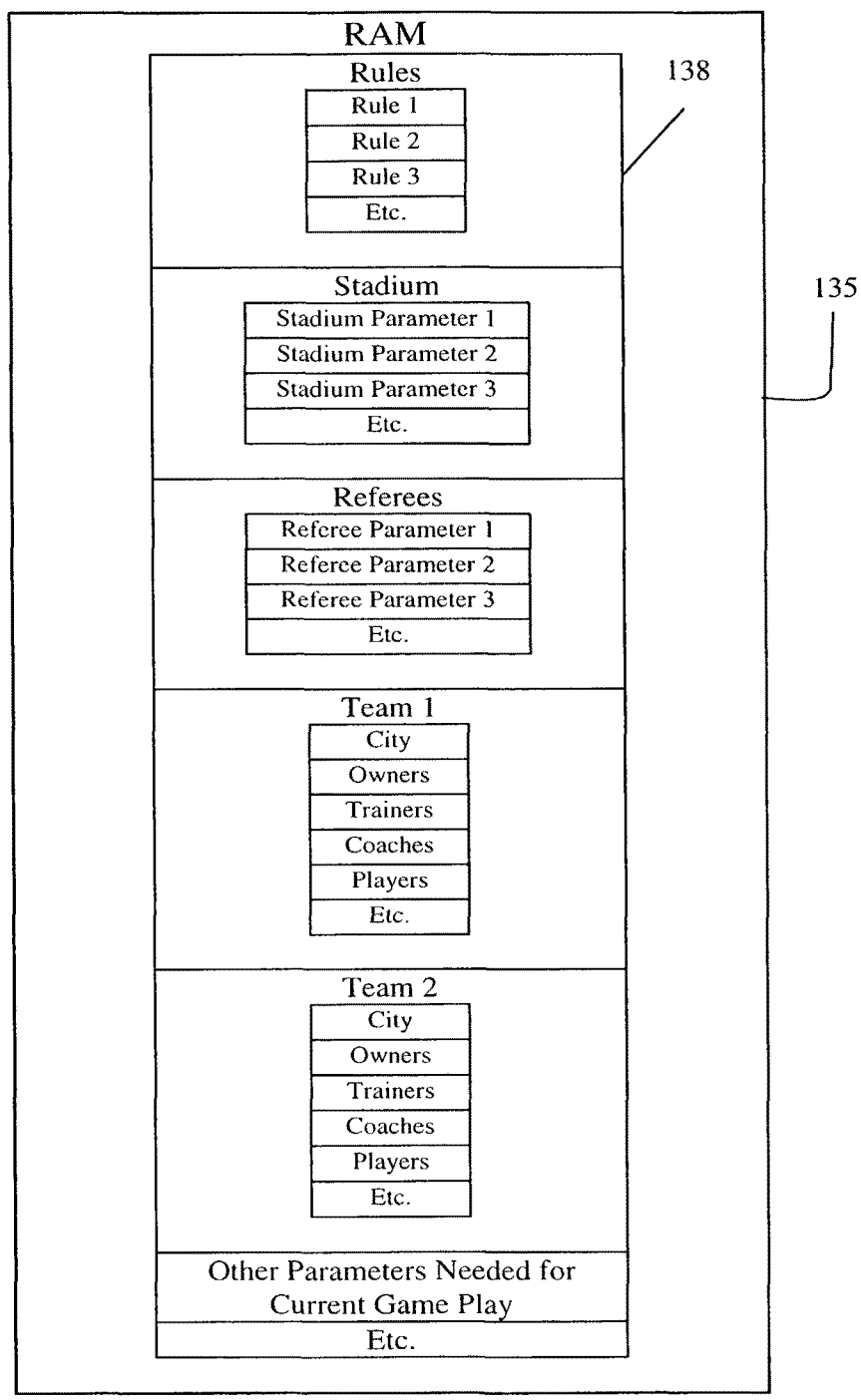
FIG. 6 is a block diagram of a RAM.

FIG. 6 is a block diagram of a RAM 135 used to store game parameters for play of a video game. RAM 135 may be used to store game parameters as are RAM 58 (FIG. 2) and RAM 95 (FIG. 3). Preferably, items are loaded from ROM 109 (FIG. 4) into RAM 135. Preferably, all of the rules 111 (FIG. 4) are loaded into RAM at 138. However, only one stadium is loaded from ROM to RAM. Also, only two teams, shown as Team 1 and Team 2 are loaded. As discussed with reference to FIGS. 1-3, above, a new parameter is downloaded from the server and stored in RAM 135. Preferably, the new parameter is stored in RAM in addition to the parameter as loaded from ROM.

Figure 7:
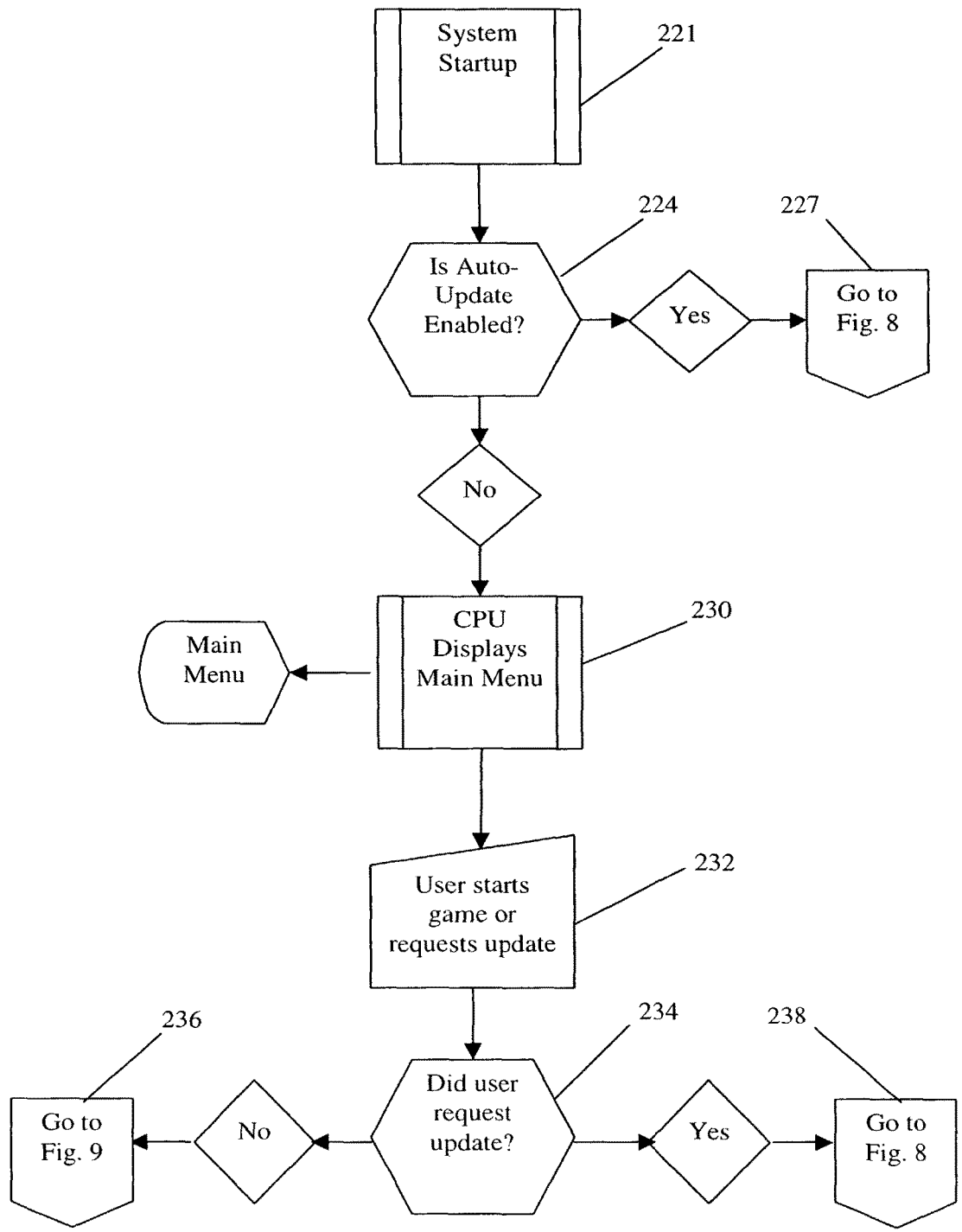
FIG. 7 is a flow chart for choosing whether to update a video game.

Referring now to FIG. 7, a flowchart is shown. In step 221, the method starts. In step 224, it is determined whether autoupdate is enabled. If autoupdate is enabled, the method continues by going to FIG. 8, as shown at step 227. If autoupdate is not enabled, the main menu is displayed at step 230. In step 232, a user chooses to start a game or request an update.

In step 234, it is determined whether the user requested an update. In step 236, the method continues by going to FIG. 9, if the user did not choose to update the video game. If the user did choose to update the video game, the method continues by going to FIG. 8, at step 238.

Figure 8:
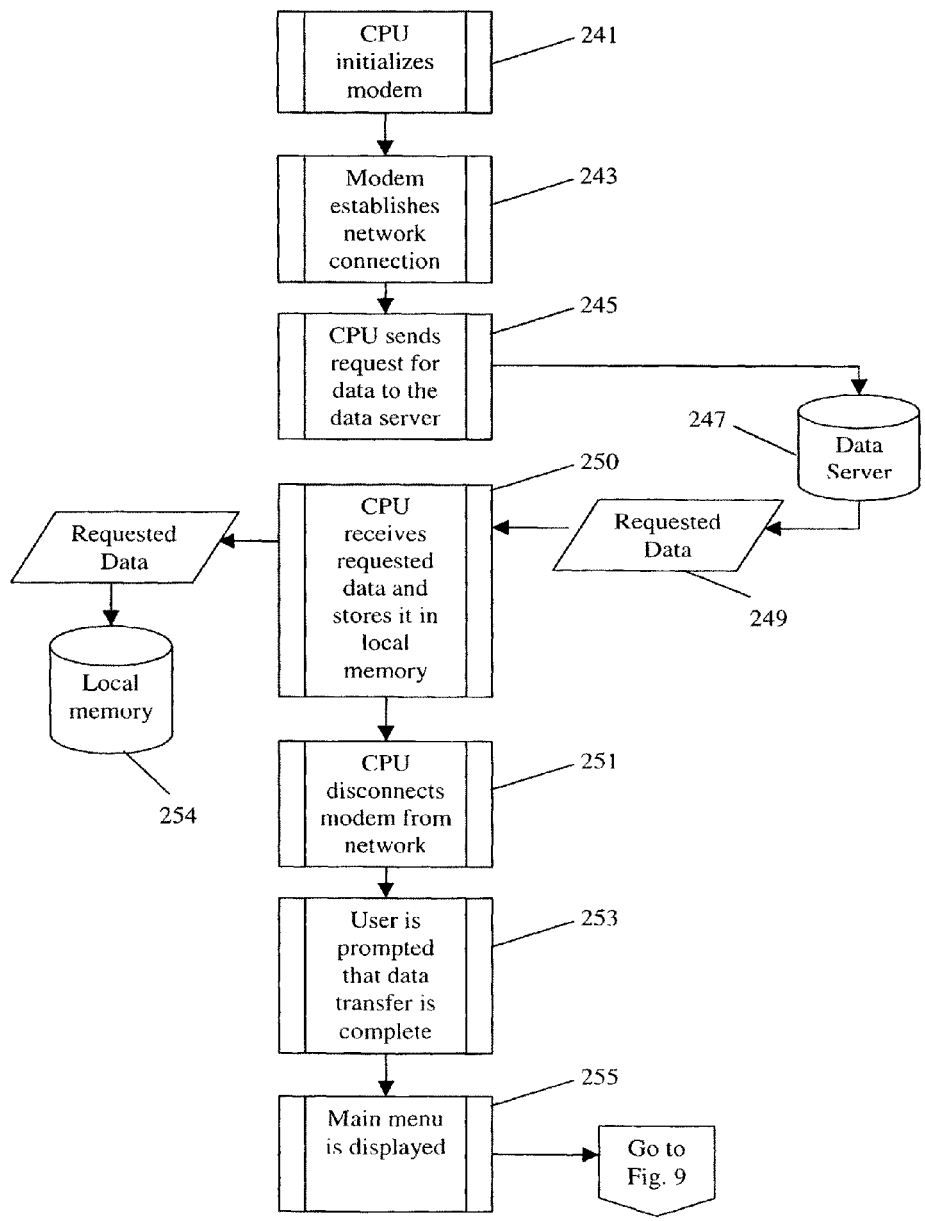
FIG. 8 is a flow chart for updating a video game.

Referring now to FIG. 8, in step 241, the CPU initializes the modem. In step 243, the modem establishes a network connection. Next, in step 245, the CPU sends a request for data to the data server. At 247 and 249, the data server sends the requested data to the CPU. Advantageously, the requested data may be updated, or changed, statistics for playing a more realistic video game. For example, as mentioned above, the user may be requesting updated batting averages for game characters in a profession baseball video game. Or, to continue the example from above, the video game player may be requesting a newly established completion percentage for an American football quarterback. Preferably, the request is for all the new statistics resulting from a real game that has already been played, or from a plurality of games.

Referring again to FIG. 8, at step 250, the CPU receives the requested data and stores it in local memory 254. In step 251, the CPU disconnects the modem from the network. Next, at step 253, the user is prompted that the data transfer is complete. The main menu is displayed at step 255, and the method continues to FIG. 9 for play of the game.

Figure 9:
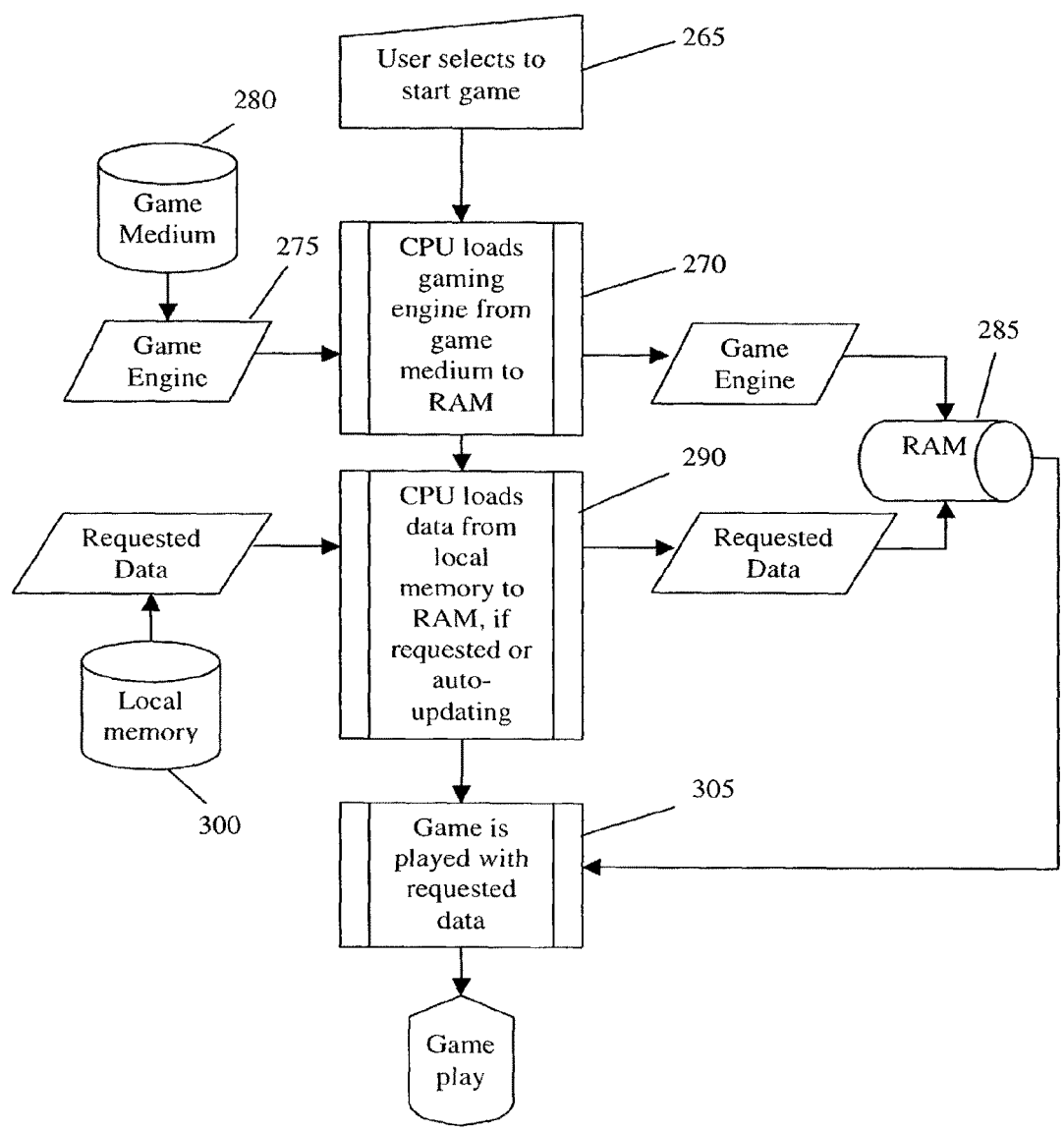
FIG. 9 is a flow chart for loading data into RAM and playing a video game.

In FIG. 9, a flowchart is shown for the play of the video game. At step 265, the game starts. Next, at step 270, the CPU loads the game engine 275 from the game medium 280 into RAM 285. Next, at step 290, the CPU loads the requested data from local memory 300 into RAM 285. The requested data 295 is preferably the changed statistics requested by the user and stored in local memory as shown in FIG. 8. This way, updated statistics, such as new player performance parameters resulting from current, real professional games can be used to play a more realistic video game, as shown at step 305.

Figure 10:
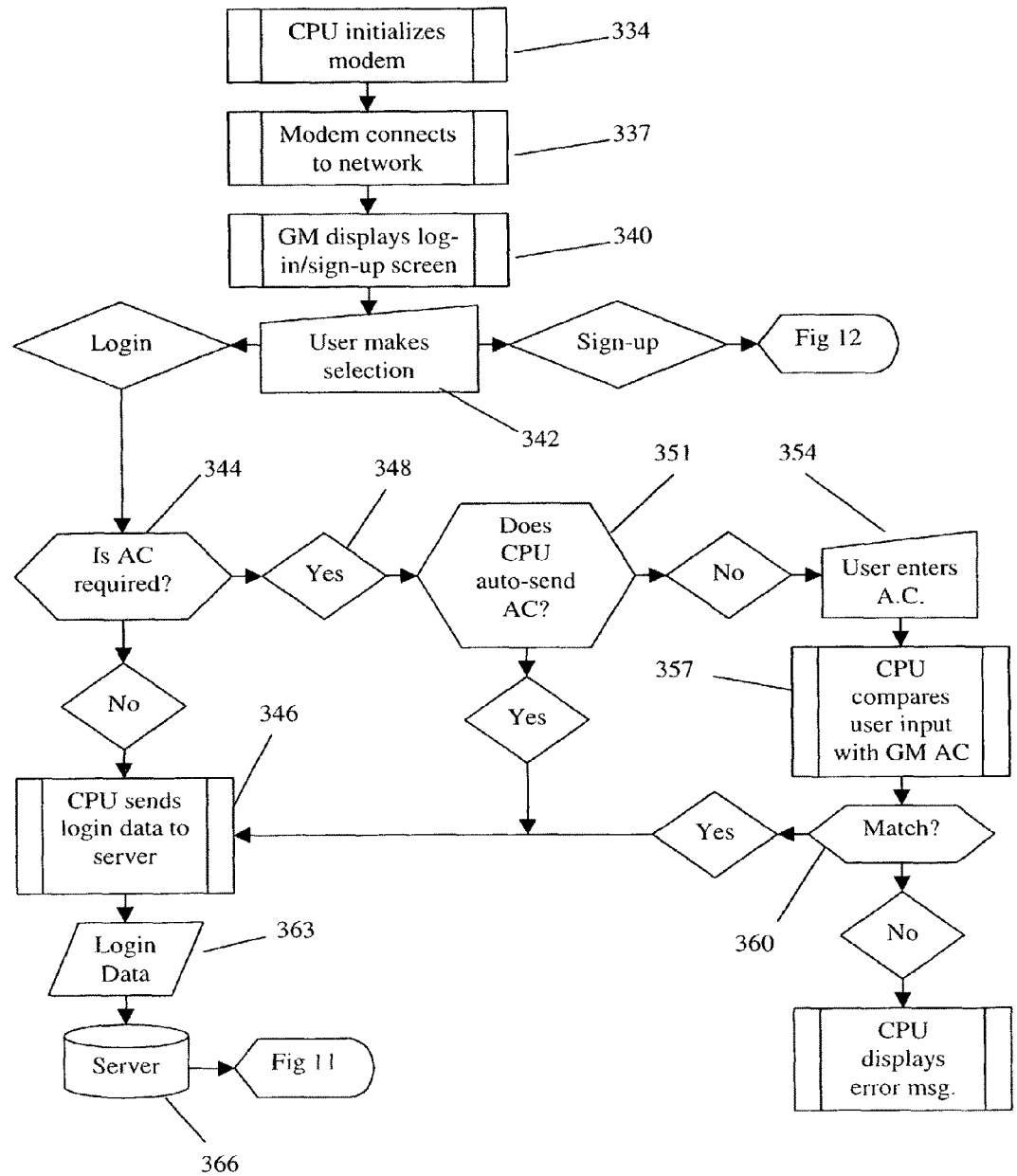
FIG. 10 is a block diagram showing a portion of a flow diagram for authenticating a user of a video game.

FIG. 10 is a block diagram showing a portion of a flow diagram for authenticating a user of a video game. At step 334, a CPU initializes a modem. The modem connects to a network at step 337. The game machine displays a login/sign-up screen at step 340. The user selects either to sign up or login in at step 342. If the user selects to login, the next step depends upon whether an authentication code (AC) is required, as shown at step 344. If no AC is required, the CPU sends the login data to the server at step 346. The flow then continues at FIG. 11.

Alternatively, an AC may be required by the network, as shown at step 348. This allows the network to verify that the user has a proper authentication code. For example, the authentication code may be provided at sign-up (described with respect to FIG. 12) by the network to the user. This way, the network administrator can verify that the user is a paying user. As another example, a new authentication code may be provided on a periodic basis, such as, for example, monthly. Thus, if a user is paying on a monthly basis, correct authentication is only available if the user's dues are current. As yet another example, the AC may be associated with a specific game machine by either the network or the CPU. This allows for security for preventing portability of AC's from one game machine to another.

Referring again to FIG. 10, if authentication is required, it depends whether the AC is auto-sent or not, as shown at step 351. If the AC is auto-sent, the process continues at step 346. If the AC is not auto-sent, the user enters a user verification code, at step 354. At step 357, the CPU compares the user verification code to a game machine authentication code. If the user verification code matches the game machine authentication code, at step 360, the process continues at step 346. As stated in step 346, the login data 363 is stored at a network server 366. Next, the process continues at FIG. 11.

FIG. 11 shows a portion of a process for authenticating a video game user, continued from FIG. 10. At step 369, the server attempts to authenticate the login data and any AC present. The AC may include a user verification code, to verify that the user is authorized to receive updated game parameters. Also, the AC may include a code identifying a specific game machine. This identifying code may, for example, be a serial number from the game machine. Alternatively, the identifying code may be a code assigned by the network administrator to the game machine at sign-up (described with respect to FIG. 12). Further, the network administrator may verify that the identifying code, the verification code, and the user login data all match. The verification code may be a password.

At step 372, the network checks whether the login data and any AC is authenticated. If the login data and any AC are authenticated, at step 376, the server sends a menu of available data to the game machine. Then, at step 384, the CPU displays the menu to the user and continues to FIG. 13. If the login data and any AC are not authenticated at step 372, the server sends a failure message to the CPU, at step 380. The CPU displays the failure message to the user, at step 388. Preferably, the CPU next displays the login/sign-up screen to the user again. The process returns to the beginning of FIG. 10, at step 334.

FIG. 12 is a flow diagram showing a process for signing up a new user of a video game with downloadable statistics. In step 390, the CPU displays, a sign-up screen. In step 393, the user enters the user's name and chosen password, and possibly other identifying information, such as a birthdate, address, etc. In step 396, the process depends upon whether the AC is autosent. If the AC is autosent, the CPU sends the sign-up data 404 to the server 408 in step 400. In step 412, the server sends account options 416 to the game machine.

In step 420, the CPU displays the account options to the user. In step 424, the user selects what type of account the user chooses. In step 428, the CPU sends the users choice of account type to the server 408. For example, the user may choose to pay for downloads of new game parameters on a monthly basis. As another example, the user may choose to pay for downloads of new game parameters for an entire sports season. Or, as yet another example, the user may choose to pay for downloads of new game parameters on a pay per use basis. Other business models will be apparent to those of skill in the art.

In step 432, the server verifies the information, creates an account and sends a menu of game data to the game machine. In step 436, the CPU displays the menu to the user. Next, the process continues as shown in FIG. 13.

Alternatively, if in step 396, the AC is not autosent, the user enters an AC, in step 440. In step 444, the CPU compares the user input AC with the game machine authentication code. In step 446, the CPU determines whether the user input AC matches the game machine AC. If not, the process continues at step 448 and the CPU displays an error message to the user. If the user input AC matches the game machine AC, the process continues at step 400.

FIG. 13 is a flow diagram showing a download process of a new game parameter. In step 450, the user selects a set of desired game parameters. For example, the desired parameters may comprise a complete set of new parameters for all teams in the game. As another example, the desired parameters may comprise the results of a single sports game for a single team. In step 453, the CPU sends the request to the server.

In step 456, the process depends on whether the game machine requires an authentication code. In step 459, the server sends the requested parameters to the CPU if the game machine does not require an authentication code. In step 462, the CPU stores the new game parameters in local memory 465.

Alternatively, if in step 456, the game machine requires an AC, the process continues to step 468. In step 468, the server attaches account information and the AC to the parameter. In step 471, the server sends the parameter to the CPU. In step 474, the CPU compares the AC with the game machine AC. In step 476, the game machine determines whether the AC sent by the server matches the AC stored on the game machine. If there is no match, the CPU displays an error message in step 482. If there is a match, the CPU stores the data at step 479 in local memory 465. The data, or new game parameters, can then be used for play in a game with quantifiably increased realism.

FIG. 14 is a flow diagram showing game play in a case in which an AC is required. In step 490, the CPU displays a game menu. In step 495, the user selects to load saved data 500, which has been stored in local memory 505. In step 510, the CPU reads data from local memory. In step 515, the CPU compares an AC associated with the data to the game machine AC. In step 520, the process determines whether the AC associated with the data is the same as the game machine AC. If they don't match, the CPU displays an error message in step 535. If they match, the CPU loads the parameter data into RAM 525 in step 530. Then, the new game parameters are used for play in a game with quantifiably increased realism.

What is claimed is:

1. A game medium configured to provide a sports video game in conjunction with a video game machine, the sports video game including video game rules and video game character parameters, the video game character parameters including video game character performance parameters associated with individual video game characters, the game medium being configured to cause the video game machine to perform a method comprising:

loading video game data stored by the game medium into a random access memory of the video game machine for playing the video game, the video game data including the video game rules and a particular video game character performance parameter associated with a particular individual video game character associated with a particular real-life sports athlete, wherein the particular video game performance parameter is based at least in part on a real-life performance of the particular real-life sports athlete playing in one or more real-life sporting events, the particular video game character performance parameter affecting the manner in which the particular individual video game character performs in the sports video game;

during a single sports season, receiving a series of updated video game character performance parameters from a data server via a network including the Internet, wherein each of the updated video game character performance parameters in the series is based at least in part on one or more different real-life performances of the particular real-life sports athlete in one or more sporting events performed during the single sports season;

updating the sports video game with each of the updated video game character performance parameters received, wherein each update changes the manner in which the particular individual video game character performs in the sports video game such that the particular individual video game character more closely simulates real-life performance attributes of the particular real-life athlete in the sports video game; and enabling a user to control the particular individual video game character in the sports video game using a video game controller connected to the video game machine.

2. A game medium as in claim 1, wherein receipt of the updated video game performance parameters in the series occurs at least weekly during at least a portion of the single sports season, such that the particular video game character simulates current real-life performance attributes of the particular real-life athlete on an at least weekly basis.

3. A game medium as in claim 1, wherein receipt of an the updated video game performance parameters in the series occurs at least daily during at least a portion of the single sports season, such that the particular video game character simulates current real-life performance attributes of the particular real-life athlete on an at least daily basis.

4. A game medium according to claim 1, the game medium being further configured to cause the video game machine to update visual aspects of the video game during a single sports season, wherein the updated visual aspects are based on a change in a real-life visual aspect of a real-life athlete, stadium, or field during a single sports season.

5. A game medium according to claim 1, the game medium being further configured to cause the video game machine to perform the method further comprising:
receiving an input from the user using the video game controller, the input directing the video game machine to connect to the data server via the internet to receive the new video game character performance parameter.

6. A game medium according to claim 1, wherein the video game enables a user to choose, or to not choose, a video game update that includes an updated video game character performance parameter.

7. A game medium according to claim 1, the game medium being further configured to cause the video game machine to perform the method periodically and automatically in response to an input received from the user using the video game controller.

8. A game medium according to claim 1, the game medium being further configured to cause the video game machine to perform the method further comprising:
receiving a change in a video game team parameter from a data server via the network, wherein the video game team parameter corresponds to a real-life trade of a real-life athlete between two real-life teams during a single sports season; and
changing a video game team in the video game based on the video game team parameter received to reflect the trade of the real-life athlete in the sports video game.

9. A game medium according to claim 1, the game medium being further configured to cause the video game machine to perform the method further comprising:
receiving an updated video game stadium parameter from a data server via the network including the Internet, wherein the video game stadium parameter corresponds to an attribute of a real-life stadium; and
changing a stadium parameter in the video game based on the updated video game stadium parameter received.

10. A game medium according to claim 9, wherein the updated video game stadium parameter is associated with an appearance of the stadium that has changed at least once during a single sports season.

11. A game medium according to claim 1, wherein the updated video game character performance parameters are each associated with a real-life performance tendency of the particular real-life athlete in the real-life performances during the single sports season.

12. A game medium according to claim 1, wherein at least one of the updated video game character performance parameters is associated with a performance of a real-life opponent of the real-life athlete in a real-life sports event during the single sports season.

13. A game medium according to claim 1, wherein at least one of the updated video game character performance parameters is associated with a points scored average of a real-life performance of the real-life athlete in a real-life sports event during the single sports season.

14. A game medium according to claim 1, wherein at least one of the updated video game character performance parameters is associated with a completion percentage of a real-life performance of the real-life athlete in a real-life sports event during a single sports season.

15. A game medium according to claim 1, wherein the sports video game is a football sports video game including video game football stadiums, video game football teams, and video game characters associated with real-life football stadiums, real-life football teams, and real-life football athletes respectively.

16. A game medium according to claim 15, wherein at least one of the updated video game character performance parameters is associated with a field goal percentage of a real-life performance of the real-life athlete in a real-life sports event during the single sports season.

17. A game medium according to claim 15, wherein at least one of the updated video game character performance parameters is associated with rush yards of a real-life performance of the real-life athlete in a particular real-life sports event during a single sports season.

18. A game medium according to claim 1, wherein the sports video game is a basketball sports video game including video game basketball courts, video game basketball teams, and video game basketball characters associated with real-life basketball courts, real-life basketball teams, and real-life basketball athletes respectively.

19. A game medium according to claim 18, wherein at least one of the updated video game character performance parameters is associated with a free-throw completion percentage of a real-life performance of the real-life athlete in a real-life sports event during the single sports season.

20. A game medium according to claim 18, wherein at least one of the updated video game character performance parameters is associated with a shots average of a real-life performance of the real-life athlete in a real-life sports event during the single sports season.

21. A game medium according to claim 1, wherein the sports video game is a soccer sports video game including video game soccer stadiums, video game soccer teams, and video game soccer characters associated with real-life soccer stadiums, real-life soccer teams, and real-life soccer athletes respectively.

22. A game medium according to claim 1, wherein, wherein at least one of the plurality of updated video game character performance parameters is based on:
a current points scored average by the particular real-life athlete in a particular real-life sports event during the single sports season;
a field goal percentage of a real-life performance of the particular real-life athlete in a particular real-life sports event during the single sports season;
a rush yards of a real-life performance of the particular real-life athlete in a particular real-life sports event during a single sports season;
a free-throw completion percentage of the particular real-life athlete in a particular real-life sports event during the single sports season;
a shots average of the particular real-life athlete in a particular real-life sports event during the single sports season; or
a completion percentage of the particular real-life athlete in a particular real-life sports event during the single sports season.

23. A method performed by a computer server for updating a video game character parameter of an individual sports video game character in a sports video game played on a video game machine during a single sports season, the sports video game character representing a particular real-life athlete in the sports video game, the method performed by the computer server comprising the following acts:
during a single sports season, storing a plurality of updated video game character performance parameters on a storage medium of the computer server, wherein each of the updated video game character performance parameters is based at least in part on a performance of the particular real-life athlete performing in one or more real-life sporting events of the single sports season;

communicating with a video game machine to establish a network connection over the Internet; and within the single sports season, transmitting the plurality of updated video game performance parameters to the video game machine in a plurality of transmissions over the network, thereby enabling the video game machine to (i) receive the plurality of updated video game performance parameters within the single sports season, and (ii) change the sports video game play based on changes in the updated video game performance parameters, such that the particular individual video game character of the sports video game more closely simulates the real-life performance of the particular real-life athlete during the single sports season.

24. A method as in claim 23, wherein, at least a portion of the transmissions are carried out at least weekly during at least a portion of the single sports season; and the at least weekly transmissions include video game character performance parameters based at least in part on real-life performances of the particular real-life athlete that occurred at least within the prior week.

25. A method as in claim 23, wherein:

at least a portion of the updated transmissions are carried out at least daily during at least a portion of the single sports season; and the at least weekly transmissions include video game character performance parameters based at least in part on real-life performances of the particular real-life athlete that occurred at least within the prior day.

26. A method as in claim 23, wherein the server is further configured to receive a request for an updated video game character performance parameter originating at the video game machine and:

verify that a payment has been made for the requested updated video game character performance parameter; or receive authorization to execute a payment for the transfer of the updated video game character performance parameter.

27. A method as in claim 23, wherein each of the updated video game performance parameters is associated with a different real-life performance of a the particular real-life athlete during a single real-life game of the single sports season.

28. A method as in claim 23, wherein the updated video game performance parameters are each associated with the performance of:

a particular real-life basketball player;

a particular real-life football player; or a particular real-life soccer player.

29. A method as in claim 23, wherein the particular real-life athlete is a real-life professional athlete that plays for a real-life professional team.

30. A method as in claim 23, wherein each of the updated video game character performance parameters are based at least in part on one or more different real-life sporting events against different opponents by the particular real-life athlete during the single sports season.

31. A method as in claim 23, further comprising:

storing a second plurality of updated video game character performance parameters, each of the second plurality of updated video game character performance parameters based at least in part on performance statistics of a second particular real-life athlete performing in one or more real-life sporting events of the single sports season, each of the second updated video game character performance parameters being based at least in part on different performance statistics from the same second particular athlete and from the same single sports season; and within the single sports season, transmitting the second plurality of updated video game character performance parameters to the video game machine in a plurality of transmissions over the network.

32. A game medium configured to provide a basketball sports video game in conjunction with a video game machine, the basketball sports video game including video game rules and basketball video game character parameters, the basketball video game character parameters including video game character performance parameters, the game medium being configured to cause the video game machine to perform a method comprising:

loading video game data stored by the game medium into a random access memory of the video game machine for playing the basketball video game, the video game data including the video game rules and a particular basketball video game character performance parameter associated with a particular basketball video game character associated with a particular real-life basketball sports athlete, wherein the particular basketball video game performance parameter is based at least in part on a real-life basketball performance of the particular real-life basketball sports athlete playing in one or more real-life basketball sporting events, the particular basketball video game character performance parameter affecting the manner in which the particular basketball video game character performs in the basketball sports video game;

during a single basketball sports season, receiving a series of updated video game basketball character performance parameters from a data server via a network including the Internet, wherein each of the updated basketball video game character performance parameters in the series is based at least in part on one or more different real-life performances of the particular real-life basketball sports athlete performed during the single sports season;

updating the basketball sports video game with each of the updated basketball video game character performance parameters received, wherein each update changes the manner in which the particular basketball video game character performs in the basketball sports video game such that the particular basketball video game character more closely simulates real-life basketball performance attributes of the particular real-life basketball athlete in the sports video game; and enabling a user to control the particular video game basketball character in the basketball sports video game using a video game controller connected to the basketball video game machine, wherein:

the basketball sports video game includes video game basketball courts, video game basketball teams, and video game basketball characters associated with real-life basketball courts, real-life basketball teams, and real-life basketball athletes respectively; and at least one of the updated video game character performance parameters is associated with a free-throw completion percentage of a real-life performance of the real-life athlete in a real-life sports event during the single sports season.

33. A game medium according to claim 32, wherein at least one of the updated video game character performance parameters is associated with a shots average of a real-life performance of the real-life athlete in a real-life basketball sports event during the single basketball sports season.

34. A game medium as in claim 32, wherein receipt of the updated basketball video game performance parameters in the series occurs at least weekly during at least a portion of the single basketball sports season, such that the particular basketball video game character simulates current real-life performance attributes of the particular real-life basketball athlete on an at least weekly basis.

35. A game medium as in claim 32, wherein receipt of an the updated basketball video game performance parameters in the series occurs at least daily during at least a portion of the single basketball sports season, such that the particular video game character simulates current real-life performance attributes of the particular real-life basketball athlete on an at least daily basis.

* * * * *